United States Patent [19]
Anthony et al.

[11] Patent Number: 5,695,243
[45] Date of Patent: Dec. 9, 1997

[54] CHILD SEAT MOUNT WITH ANTI-TWIST WEB MECHANISM

[75] Inventors: James R. Anthony, Carmel; Peter E. Miller, Noblesville; Vance P. Voorhis, Tipton; Gerald W. Thompson, Fishers, all of Ind.

[73] Assignee: Indiana Mills and Manufacturing, Inc., Westfield, Ind.

[21] Appl. No.: 623,694

[22] Filed: Apr. 15, 1996

Related U.S. Application Data

[63] Continuation-in-part of Ser. No. 594,840, Jan. 31, 1996.
[51] Int. Cl.⁶ .................................................. A47D 1/10
[52] U.S. Cl. ........................... 297/250.1; 297/216.11; 297/482; 297/468
[58] Field of Search ........................ 297/468, 482, 297/487, 216.11, 216.13, 256, 250.1

[56] References Cited

U.S. PATENT DOCUMENTS

| | | | |
|---|---|---|---|
| 3,709,558 | 1/1973 | Jakob | 297/250.1 |
| 3,791,694 | 2/1974 | Roberts et al. | 297/250.1 |
| 4,014,080 | 3/1977 | Caradec | 297/468 X |
| 4,913,490 | 4/1990 | Takahashi et al. | 297/468 X |
| 5,118,163 | 6/1992 | Brittian et al. | |
| 5,178,439 | 1/1993 | McCracken | 297/482 |
| 5,248,187 | 9/1993 | Harrison | 297/482 |
| 5,335,957 | 8/1994 | Golder | 297/482 |
| 5,421,614 | 6/1995 | Zheng | 297/482 X |
| 5,458,398 | 10/1995 | Meeker et al. | 297/250.1 |

Primary Examiner—Peter M. Cuomo
Assistant Examiner—Stephen Vu
Attorney, Agent, or Firm—Woodard, Emhardt, Naughton, Moriarty & McNett

[57] ABSTRACT

A mounting arrangement for securing a child seat to a vehicle passenger seat. A web has opposite ends with buckles mounted thereto lockingly engageable with tongues extending from the vehicle passenger seat. The web extends into a tube rotatably mounted to the child seat preventing twisting of the web. The child seat may face forward or rearward with the webs attached to the child seat being pivotable to accommodate same. Alternate embodiments include the mounting of the web to the child seat by a plate, by pivoting brackets and by extending the web through holes provided in the child seat side walls.

7 Claims, 13 Drawing Sheets

CHILD SEAT MOUNT WITH ANTI-TWIST WEB MECHANISM

REFERENCE TO RELATED APPLICATIONS

This application is a continuation-in-part of U.S. patent application Ser. No. 08/594,840, filed on Jan. 31, 1996 by the same inventive entity, and entitled CHILD SEAT MOUNT.

BACKGROUND OF THE INVENTION

1. Field of the Invention

This invention is in the field of vehicle child seats.

2. Description of the Prior Art

Often when small children ride in an automobile, they are placed in a child seat which is placed upon the seat of the automobile. The child seat normally includes a set of seat belts which secure the child. The child seat is, in turn, normally secured to the automobile in some fashion utilizing the seat belts which are permanently attached inside the vehicle. However, the standard seat belts for an automobile are designed to secure an adult to the seat of the automobile rather than designed to hold a child seat. Consequently, the child seat must be designed to accommodate being secured to the automobile with any of the several different types of restraining means available in different automobiles. These include but are not limited to lap belts, shoulder belts, combined lap and shoulder belts and the like.

Figure 1:
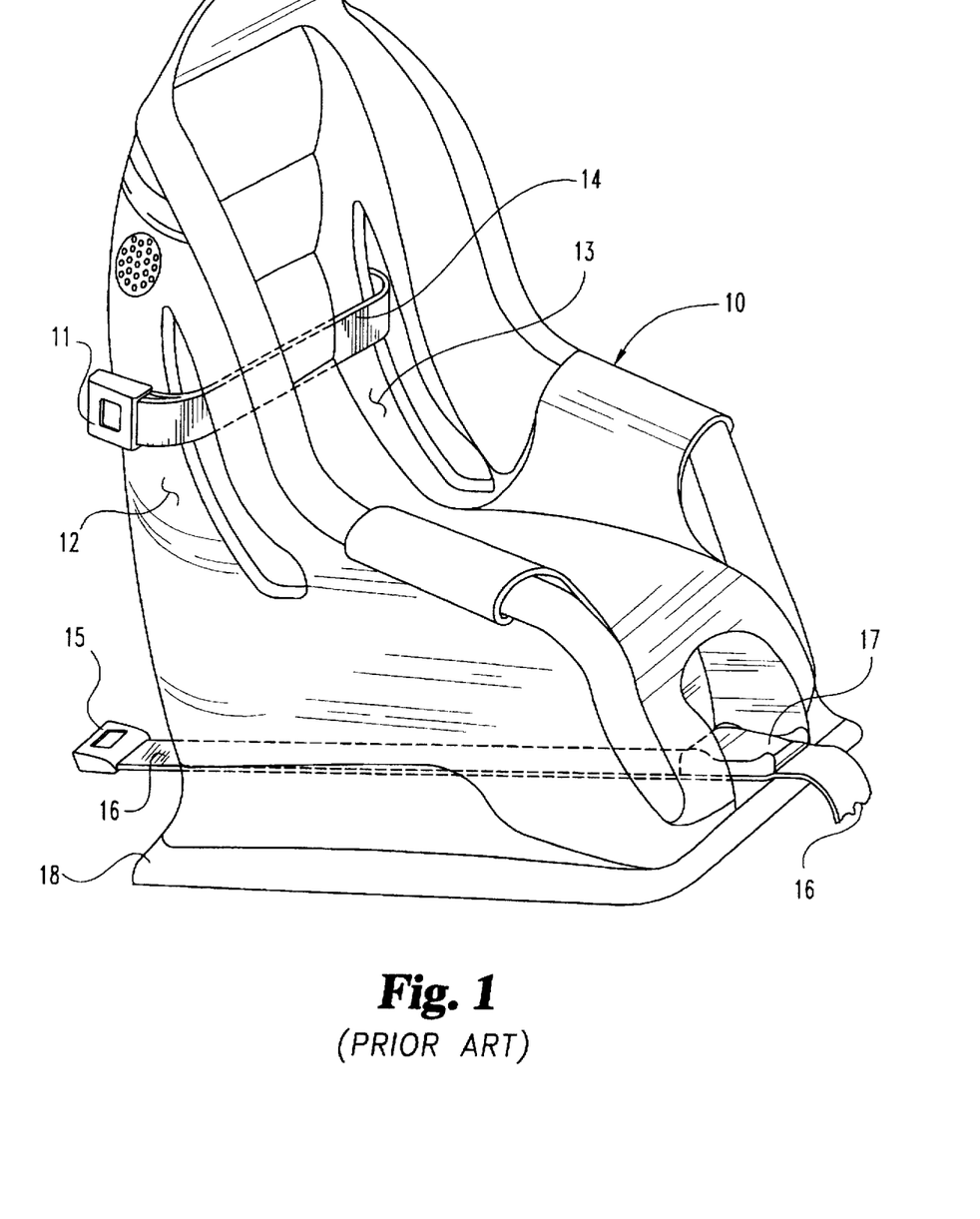
FIG. 1 is perspective view of a prior art child seat.

In order to overcome many of the aforementioned disadvantages in utilizing the normal passenger restraints for holding the child seat, a prior child seat, shown in FIG. 1, has been designed to integrate directly to fastening devices mounted to the passenger seat separate from the normal passenger restraint system. The prior child seat 10 (FIG. 1) includes a pair of conventional buckles fixedly attached to the opposite sides 12 and 13 of the child seat. In addition, a web 14 interconnects buckles 11 together. A third buckle 15 is mounted to the end of a web 16 extending through the seat to a tightening clamp 17.

The pair of buckles 11 and buckle 15 interlock with locking devices or tongues fixedly attached by brackets directly to the back of the passenger seat or to the vehicle frame. When using seat 10, the base 18 of the seat is placed atop the seat cushion so that the child faces forwardly. The pair of tongues which mate with buckles 11 protrude outwardly from the generally vertically extending passenger seat cushion and are lockingly engaged with buckles 11. Likewise, a third locking device or tongue extends outwardly from the junction of the horizontally extending cushion and vertically extending cushion of the passenger seat and lockingly engages buckle 15. Web 16 is then pulled tight with clamp 17 limiting relative motion between the web and the child seat.

Several improvements are needed over the child seat shown in FIG. 1. For example, it is desirable to have adjusting means associated with the buckles 11 and their mating tongues in order that the child seat may easily be locked to the passenger seat. Likewise, it is desirable to allow some flexibility in the mounting of buckles 11 and mating tongues combination to facilitate easy installation of the child seat relative to the passenger seat. Likewise, it is desirable to have a third buckle tongue combination located at the top of the child seat to facilitate the easy removal and installation of the child seat. In many instances, it is desired to orient the child seat 10 so that the child faces rearwardly. The buckle tongue combinations must therefore be designed to allow the orientation of the child seat in either a forward facing direction or a rearward facing direction.

U.S. Pat. No. 5,118,163 issued to Brittian et al. discloses a child seat having a pair of rearwardly extending webs with locking devices thereon which, in turn, lockingly engage mating locks on a bar extending along and beneath an aircraft seat. The Brittian seat, however, does not contemplate positioning the child seat atop the passenger seat nor allow for the different orientations of the child seat, both in the rearward direction and the forward direction.

Disclosed herein is a child seat including a number of unique features as compared to the aforementioned approaches. Our seat is restable atop the passenger seat and may be oriented in both the rearward direction as well as the forward direction. The locking devices are connected to the child seat by means of flexible webs thereby allowing the locking devices to more readily be interconnected with mating locking devices protruding outwardly from the passenger seat. The passenger seat locking devices are mounted on semi-rigid webs allowing the devices to be moved laterally to lockingly engage the child seat locking devices. Further, a third locking device is mounted atop the child seat and extends rearwardly to a mating lock secured to the vehicle facilitating easy removal or installation of the child seat.

The child seat disclosed herein is particularly advantageous as compared to seats mountable atop a flat surface, such as, a floor. More specifically, our child seat may be mounted atop a variety of sloping, humped, soft or other types of passenger cushioned seats since we employ a unique mounting arrangement between the child seat and the passenger seat. A pair of belts having ends movably mounted to the opposite sides of the child seat extend rearwardly in a straight line to the mating locks extending outwardly from the passenger seat. The pair of belts further extend at an acute angle 83 (FIG. 2) relative to the horizontal of between 30 to 60 degrees thereby limiting movement or excursion of the child seat in both the horizontal and vertical directions. Further, the child seat disclosed herein utilizes quick release operated seat belt buckles on the mounting belts thereby allowing mounting of the child seat with one hand and quick and easy two handed release of the seat with child in event of an accident.

SUMMARY OF THE INVENTION

A child seat mounting arrangement for a vehicle comprising a vehicle passenger seat and a child seat restable atop the passenger seat in a first position whereat the child faces forwardly on the passenger seat and in a second position whereat the child faces rearwardly on the passenger seat. The child seat includes a seat portion and a back portion upon and against which the child rests. Flexible webs are mounted to the child seat and have distal end portions with first locking devices mounted to the distal end portions. Adjustment devices are engaged with the webs and are operable to control tightness of the webs. Second locking devices are mounted to the vehicle adjacent the passenger seat and are lockingly engageable with the first locking devices to secure the child seat to the passenger seat when the child seat is in the first position and when in the second position.

It is an object of the present invention to provide a new and improved child seat.

A further object of the present invention is to provide a new and improved mounting arrangement for securing a child seat to a vehicle passenger seat.

An additional object of the present invention is to provide a child seat which may be oriented facing rearwardly or facing forwardly atop the passenger seat with the interconnection between the child seat and passenger seat accommodating same.

Yet another object of the present invention is to provide a child seat and passenger seat having mating locks which are sufficiently flexible and positioned to facilitate the easy installation and removal of the child seat from atop the passenger seat.

In addition, it is an object of the present invention to provide a child seat mounting arrangement for a vehicle secured by a web connected to the child seat by an anti-twist mechanism.

Further, it is an object of the present invention to provide a child seat mounting arrangement secured to a vehicle by a single strap.

Related objects and advantages will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Webs 48 and 49 are pivotally mounted to the opposite sides of the child seat. Each web 48 and 49 includes an outer end portion with a locking device, such as a buckle, mounted thereto which, in turn, lockingly engages a mating locking device, such as a tongue, mounted to a semi-rigid web extending outwardly from the passenger seat. Web 48 will now be described it being understood that a similar description applies to web 49. Web 48 includes an inner end 50 (FIG. 2) connected to a bracket 51 pivotally mounted by a conventional fastener 52 secured to side 53 of the child seat. Web 48 includes an outer end portion 54 adjustably connected to a buckle 55 having web adjusting means secured thereto. Buckle 55, in turn, lockingly engages a locking device, such as a tongue 56 mounted to a semi-rigid belt or web 57 extending outwardly from between back cushion 42 and seat cushion 43. Webs 57 are fixedly secured to the vehicle or passenger seat frame.

A pair of webs 57 (FIG. 3) are mounted to the seat and extend outwardly, in all embodiments disclosed herein, being spaced apart an appropriate distance to position or match up the locking devices or tongues 56 adjacent the mating locking devices or buckles 55. Buckle 55 includes a conventional push button activated pawl which is movable into locking engagement with an aperture provided on a conventional seat web buckle tongue 56. The free end 58 of web 48 may be provided with synthetic fasteners, such as VELCRO to removably engage a cloth portion of the child seat thereby preventing the end of the web from dangling.

The proximal end 60 (FIG. 6) of web 49 is pivotally mounted by a bracket identical to bracket 51 to side wall 59 of the child seat. The mounting brackets 51 pivotally mounting the proximal ends of webs 48 and 49 are aligned and secured to the side walls along axis 61 which extends through the center of gravity 62 or within a radius of three inches of the center of gravity with the seat occupied by the child. The child seat is designed to hold a child having an approximate weight up to 60 lbs.

The pivotal mounting by brackets 51 allow the flexible webs 48 and 49 to each extend in a straight line from axis 61 toward the tongues 56 lockingly engaged with buckles 55 regardless of the positioning of the child seat upon seat cushion 43. Thus, the child seat may face either forwardly with webs 48 and 49 projecting in a general direction toward the rear 63 (FIG. 3) of the child seat or the webs 48 and 49 may be pivoted to extend toward the front 64 (FIG. 2) of the child seat when the child seat faces rearwardly.

The design of buckle 55 is disclosed in co-pending U.S. patent application filed Dec. 18, 1995 entitled "Buckle with Strap Adjuster" by inventor James R. Anthony which is herewith incorporated by reference. The buckle includes housing 65 (FIG. 5) containing a spring biased pawl operated by push button 66. The mouth 67 of the buckle is configured to receive a conventional seat belt buckle tongue 56 enabling the pawl to lockingly and releasably engage the tongue. A variety of spring biased push button seat belt buckles are known such as disclosed in the commonly owned U.S. Pat. No. 5,182,837 which is herewith incorporated by reference.

Figure 4:
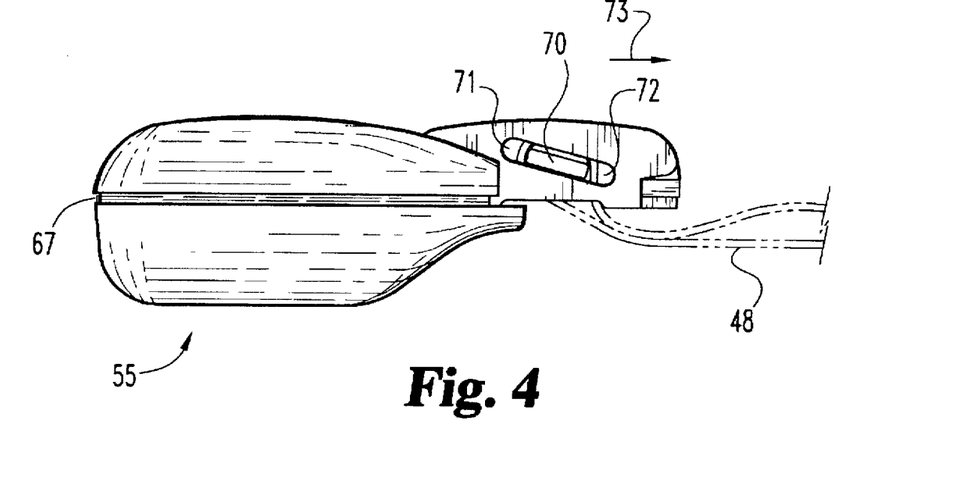
FIG. 4 is an enlarged side view of one of the buckles with adjusting means shown in FIGS. 2 and 3.
Figure 5:
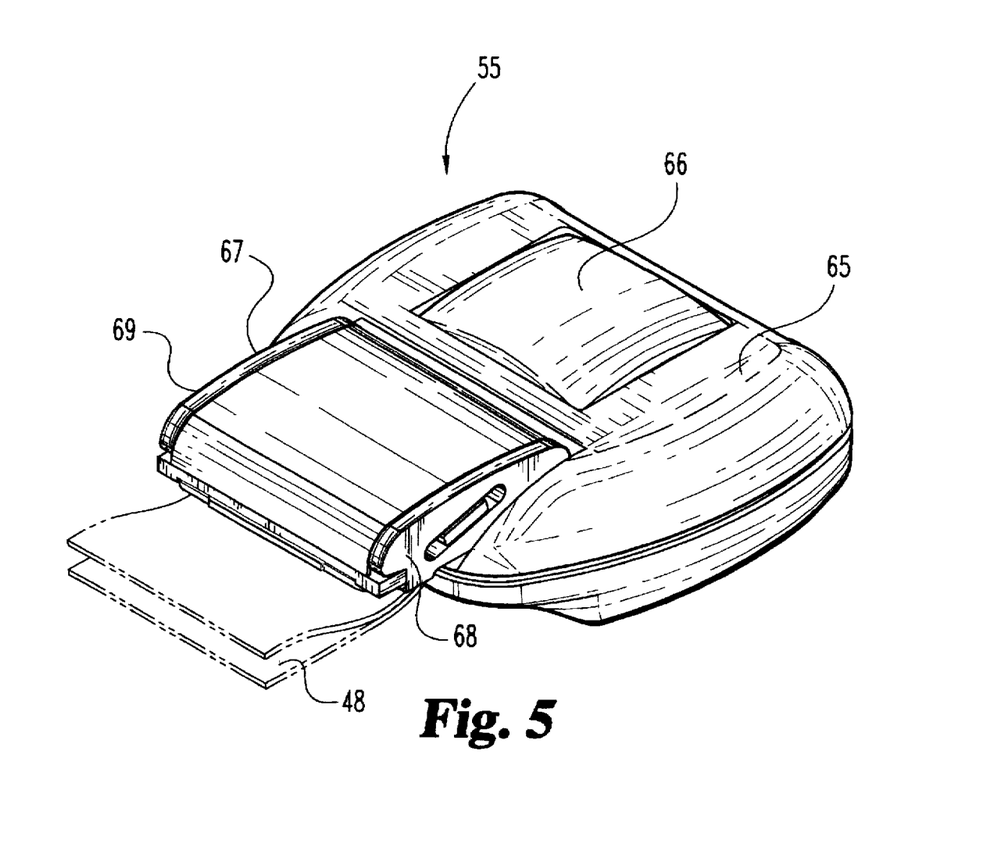
FIG. 5 is a perspective view of the buckle of FIG. 4.

Buckle 55 includes a web adjusting means 67 having a pair of spaced apart flanges 68 and 69. A roller 70 has opposite ends slidably received in a pair of slots 71 provided in flanges 68 and 69. Web 48 extends around roller 70 with the roller being slidable to allow for the adjustment of the web relative to the buckle. For example, roller 70 may be moved in a direction opposite of arrow 73 thereby moving web 48 apart from interior stop edge 72 in a manner similar to a known roller belt adjusting means shown in the commonly owned U.S. Pat. No. 4,196,500 which is incorporated herein by reference. Movement of roller 70 in the direction of arrow 73 forces web 48 against interior contact edge 72 thereby limiting relative motion between the buckle and web. In operation, buckles 55 are lockingly engaged with tongues 56 with the free ends 58 of straps 48 and 49 then being pulled enabling rollers 70 to move apart from contact edges 72 thereby tightening straps 48 and 49 and securing the child seat tightly to the passenger seat.

Figure 6:
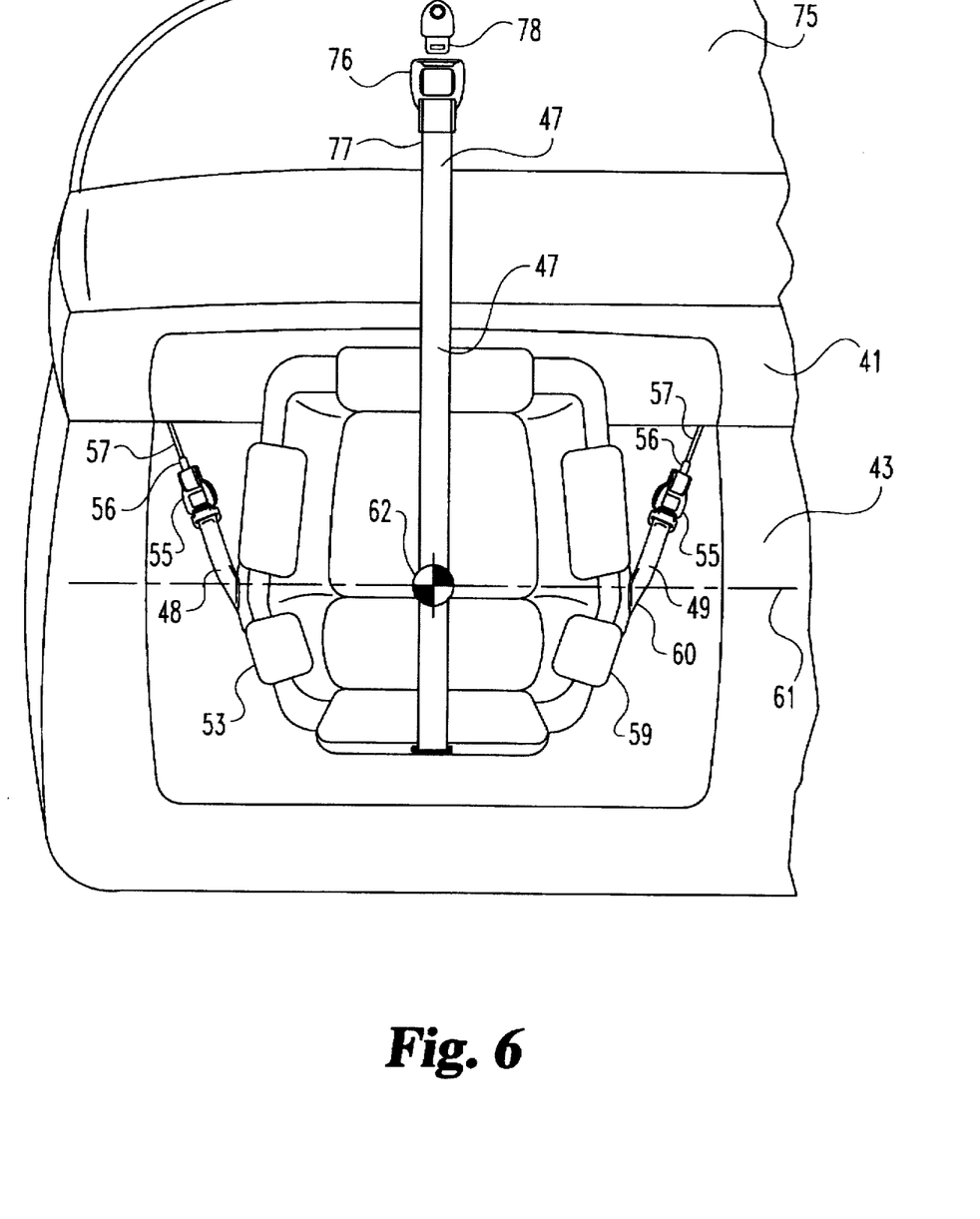
FIG. 6 is a fragmentary and reduced top view of the child seat of FIG. 2 positioned atop the passenger seat.

A third web 47 (FIG. 2) has a proximal end 74 fixedly mounted to the top end of the child seat and extends rearwardly toward the vehicle rear window sill 75 (FIG. 6). A buckle 76 identical to buckle 55 is adjustably mounted to the distal end portion 77 of web 47 and is lockingly and releasably engageable with a conventional seat belt buckle tongue 78 mounted atop and to the rear window sill. Thus, once buckle 76 is lockingly engaged with tongue 78 and the free end of web 47 is pulled to tighten the web, relative motion of the top end of the child seat relative to the passenger seat is limited. Web 47 is depicted as extending rearwardly when the child seat is facing rearward; however, it is to be understood web 47 may be reversed to also extend rearward even though the child seat is facing forward as depicted in FIG. 3. In either event, the buckle adjustably mounted to the distal end portion of the web may be locked to the tongue mounted to the rear window sill.

Webs 57 (FIGS. 3 and 6) extend from the intersection of the back cushion 42 and bottom cushion 43 and are semi rigid facilitating insertion of the attached tongues into buckles 55. The rigidity of webs 57 is achieved by encasing the webs within a urethane outer coating. A pair of tongues 80 (FIG. 3) are provided on the opposite sides of the child seat to lockingly receive buckles 80 when the buckles are not engaged with tongues 56 and the child seat is in a stored condition.

Figure 2:
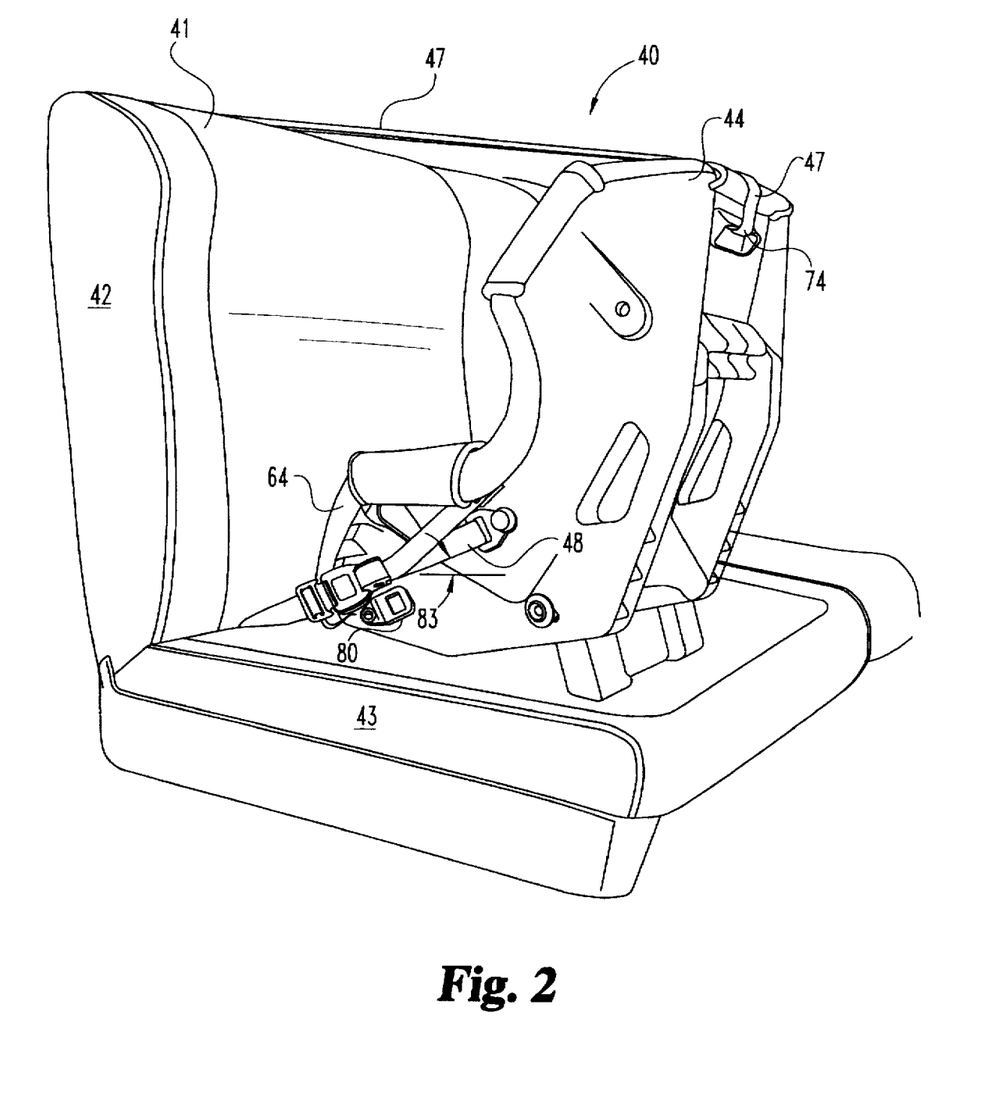
FIG. 2 is a perspective view of a passenger seat and rearwardly facing child seat incorporating a third alternate embodiment of the present invention.
Figure 3:
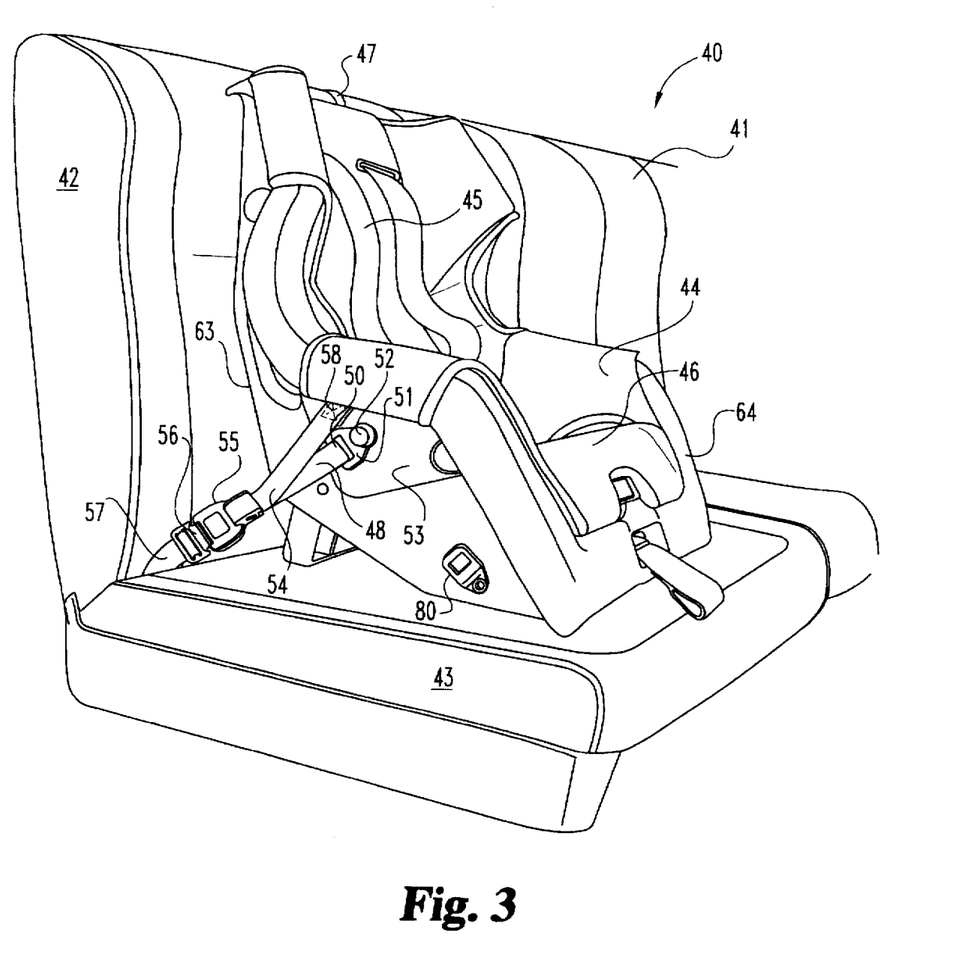
FIG. 3 is the same view as FIG. 2 only showing the child seat facing forwardly.
Figure 7:
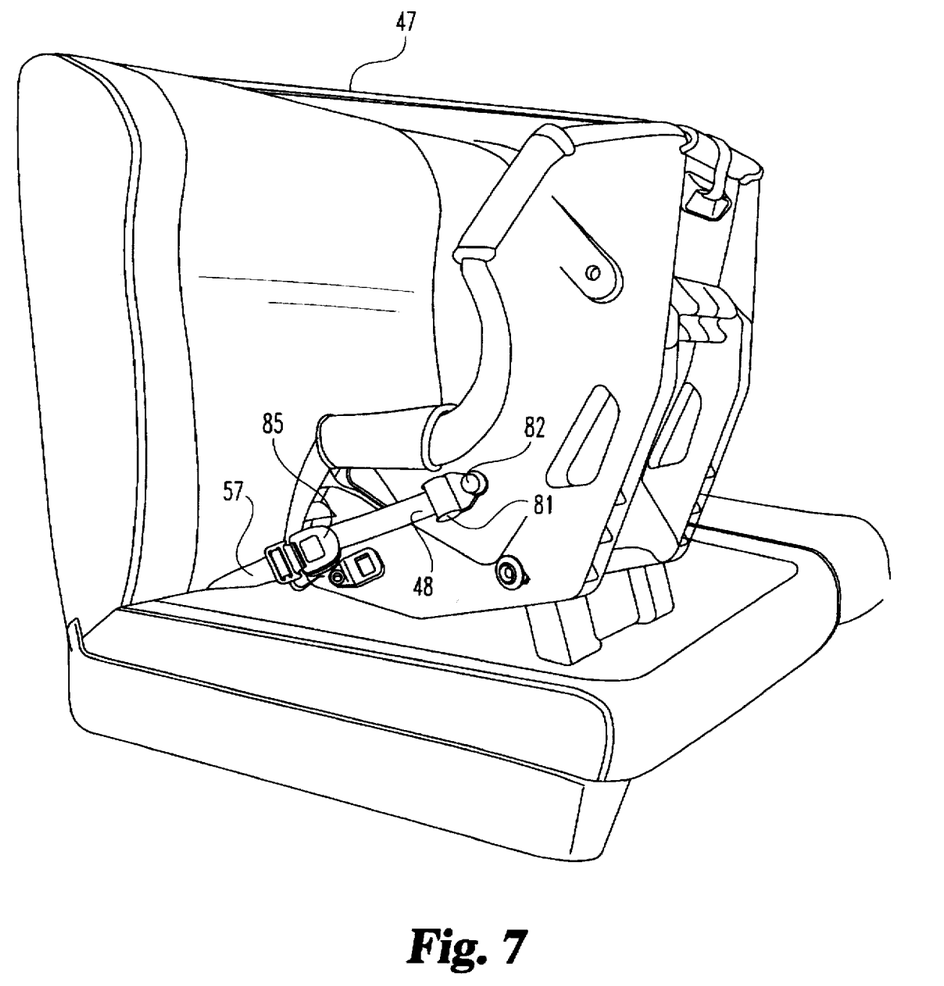
FIG. 7 is the same view as FIG. 2 only showing a fourth alternate embodiment of the child seat.

The fourth alternate embodiment of the child seat is depicted in FIG. 7 and is identical to third alternate embodiment of the child seat described and illustrated in FIG. 2 with the exception that the proximal ends of the two webs 48 and 49 are mounted by a pair of conventional miniature automatic locking retractors 81 operable to allow retraction or extension of the webs. Each retractor 81 is pivotally, mounted by conventional fastening devices 82 in a manner identical to that described for mounting brackets 51. That is, retractors 81 are mounted along an axis extending approximately through or within a radius of three inches of the center of gravity of the child seat when occupied. The retractors allow webs 48 and 49 to extend in a straight line toward tongues 56 regardless of whether the child seat is facing rearward or forward. Buckles 85 are fixedly mounted to the distal ends of webs 48 and 49 and are identical to buckles 55 except adjusting means 67 are not provided since the web is tightened automatically by retractors 81. Web 47 is provided at the top of the child seat and is identical in construction and operation as described for the design of FIGS. 2 and 3.

Figure 8:
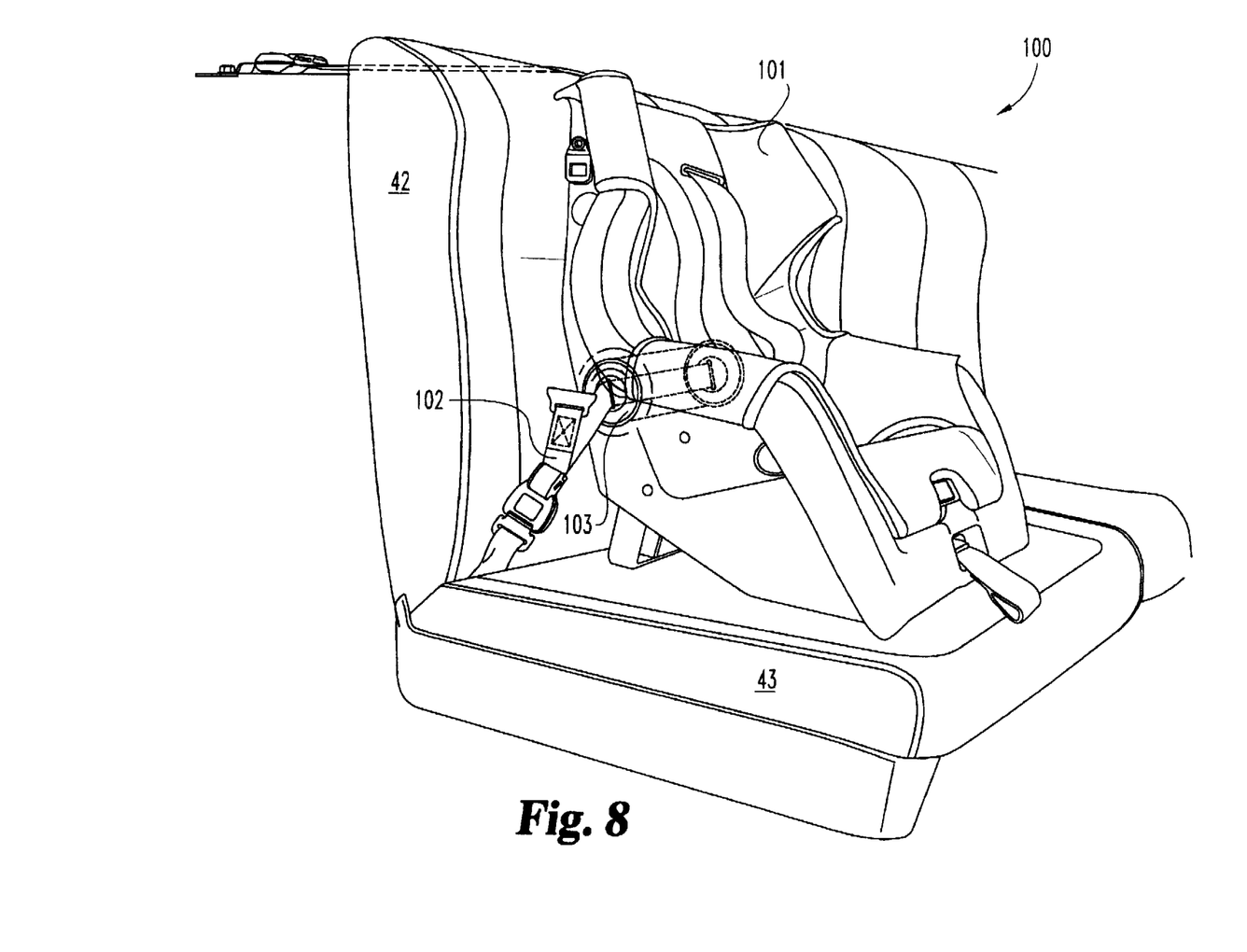
FIG. 8 is a perspective view of a passenger seat and forwardly facing child seat incorporating the preferred embodiment of the present invention.
Figure 9:
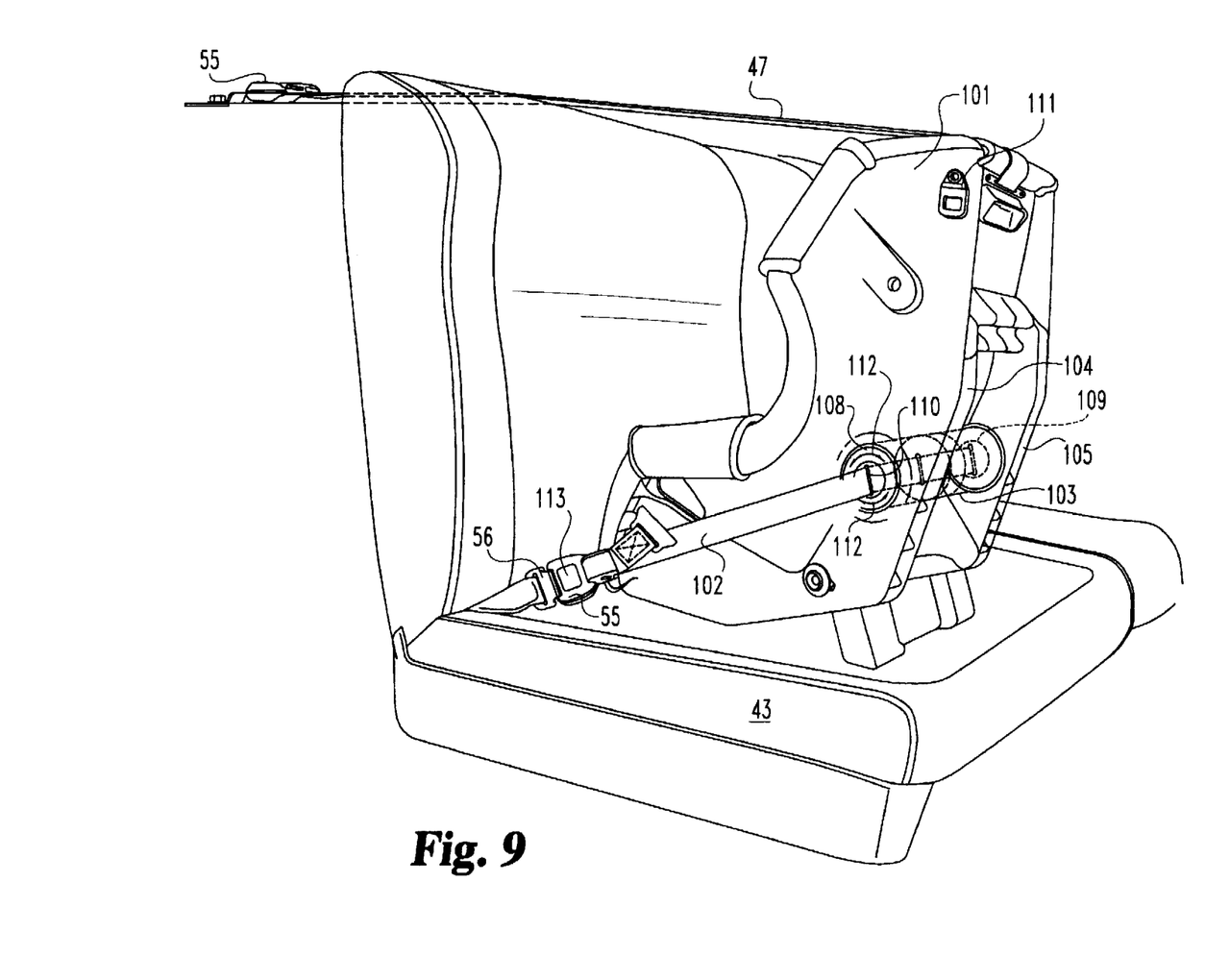
FIG. 9 is the same view as FIG. 8 only showing the child seat facing rearward.

The preferred embodiment of the child seat and passenger seat combination 100 is depicted in FIGS. 8 and 9 with the child seat oriented so the child faces forward in FIG. 8 whereas in FIG. 9 the child seat is oriented atop the passenger seat 43 so if the child faces rearwardly. Child seat 101 is identical to the child seat illustrated in FIG. 2 with the exception that a single strap 102 is mounted to the rear portion of child seat 101 by a web anti-twist mechanism 103. Optionally, a top web 47 may be fixedly attached to the top end of the child seat with the web extending rearwardly to a buckle 55 releasably lockable with a seat belt tongue mounted to and atop the rear window sill as previously described for the embodiment of FIG. 2.

Figure 10:
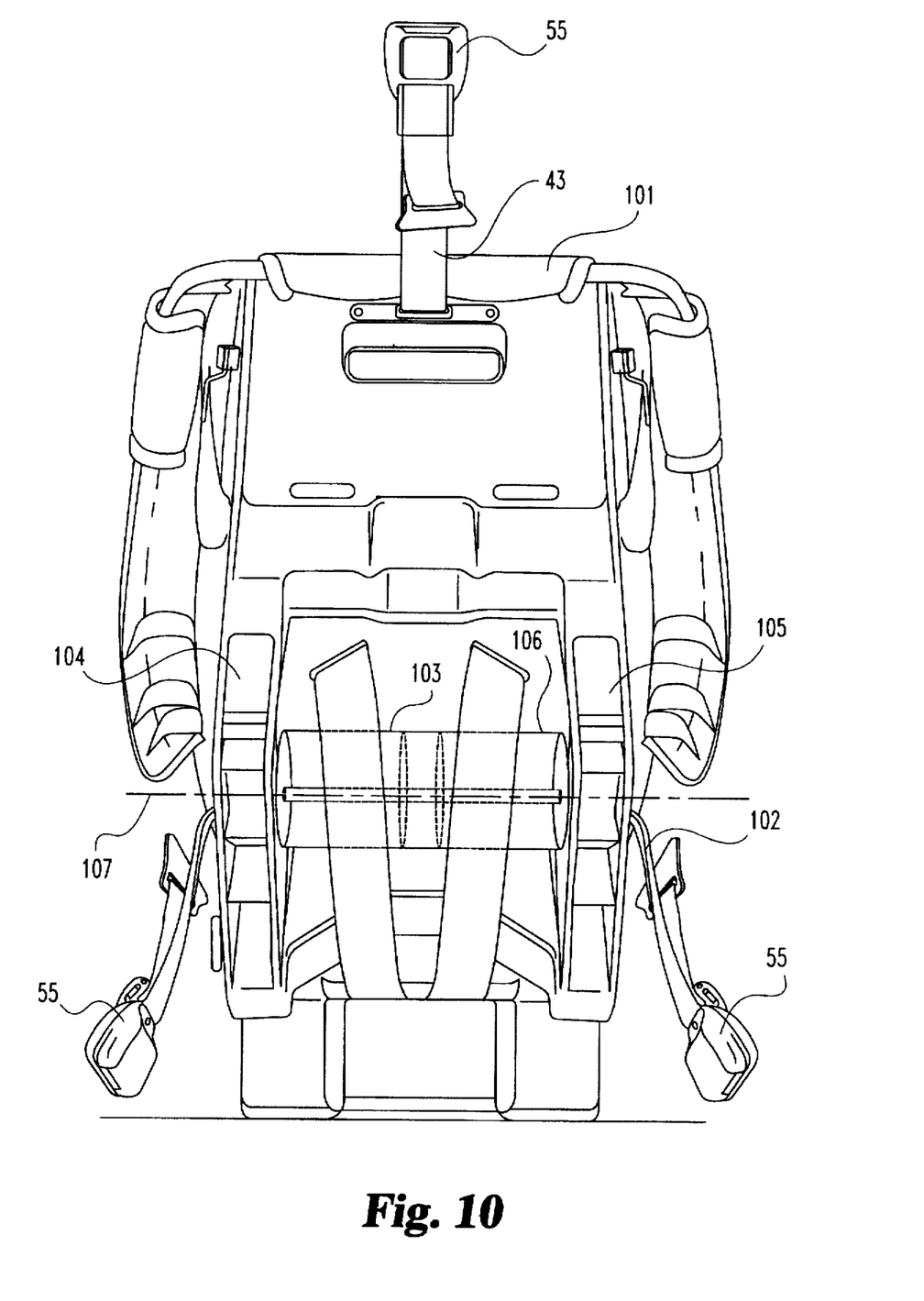
FIG. 10 is a rear view of the child seat of FIG. 8.

Anti-twist mechanism 103 has a tubular shaped main body 106 (FIG. 10) with opposite ends rotatably mounted to the rear side walls 104 and 105 of the child seat. Main body 106 is rotatable about its longitudinal axis 107 and is hollow defining a passage into which web 102 extends. Each end of the anti-twist mechanism is disc shape and includes a slot through which web 102 extends. The disc shaped ends 108 and 109 may be plates attached to the (FIG. 9) tubular main body 106 and are flush with the outwardly facing surfaces of side walls 104 and 105. Disc end 108 includes slot 110 sized approximately the same as the cross section of web 102 thereby insuring the web 102 pivots as a unit with the anti-twist mechanism 103. A similar slot is provided in disc shaped end 109.

Located at the opposite ends of web 102 are a pair of buckles 80 as previously described for the embodiment of FIG. 2 with adjustment means provided thereon for sizing the length of the web thereby positioning the buckles adjacent the seat belt tongues 56 which project outwardly from the seat as previously described. Web 102 extends from the left buckle 55 shown in FIG. 9 through slot 110 and then through the anti-twist mechanism 103 exiting the slot on disc 109 and extending to the right positioned buckle. A pair of storage tongues 111 (FIG. 9) are located at the top end of child seat 101 for lockingly engaging buckles 80 when the child seat is not in use.

Figure 11:
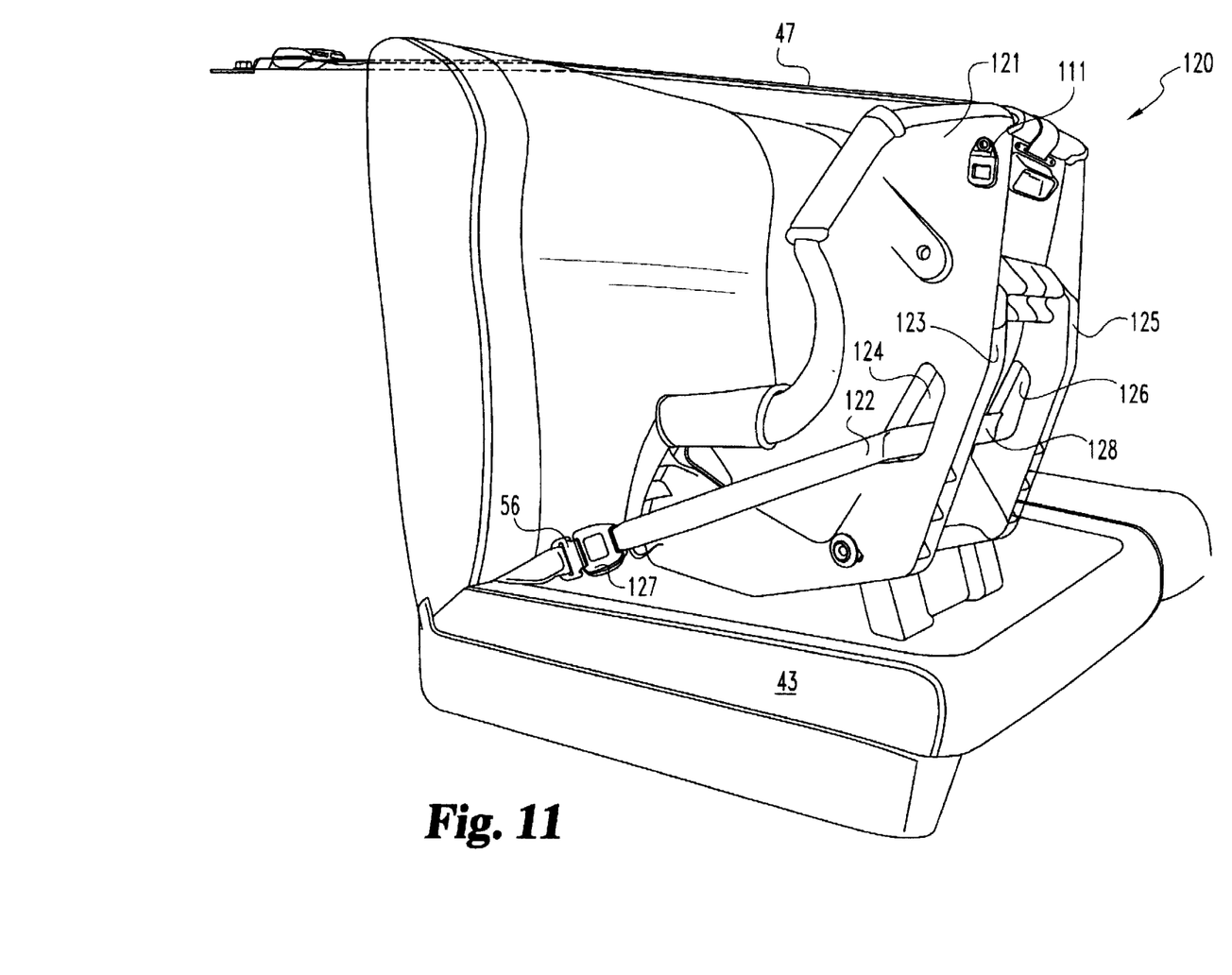
FIG. 11 is a perspective view of a child seat facing rearwardly atop a passenger seat and incorporating rating the first alternate embodiment of the present invention.

Web 102 is fixedly attached to the anti-twist mechanism 103 by conventional fastening devices located within tubular main body 106. Since slots 110 provided on ends 108 and 109 are sized approximately the same as the cross section of web 102, the web is prevented from twisting within tubular main body 106. The slots provided in ends 108 and 109 (FIG. 9) are aligned with each other as are the holes 124 and 126 (FIG. 11). Each buckle 55 includes a conventional push button 113 (FIG. 9) with each push button facing outward relative to the child seat when each web is not twisted between the buckle and the ends 108 and 109 of the anti-twist mechanism. Mechanism 103 pivots as shown by arrows 112 (FIG. 9) along axis 107 thereby allowing webs 102 to be pivoted when the child seat is installed either in the rearward facing position of FIG. 9 or the forward facing position of FIG. 8 and insuring push buttons 113 always face outwardly so long as the webs don't twist between the anti-twist mechanism and the buckles facilitating ease of installation and removal. The adjustment device on each buckle allows for tightening of the web securely pulling the child seat to the passenger seat. As described for the other embodiments herein, web 102 extends in a straight line from the mounting of the web to the child seat to each buckle 55 regardless of whether the child seat faces forward or rearward.

Figure 12:
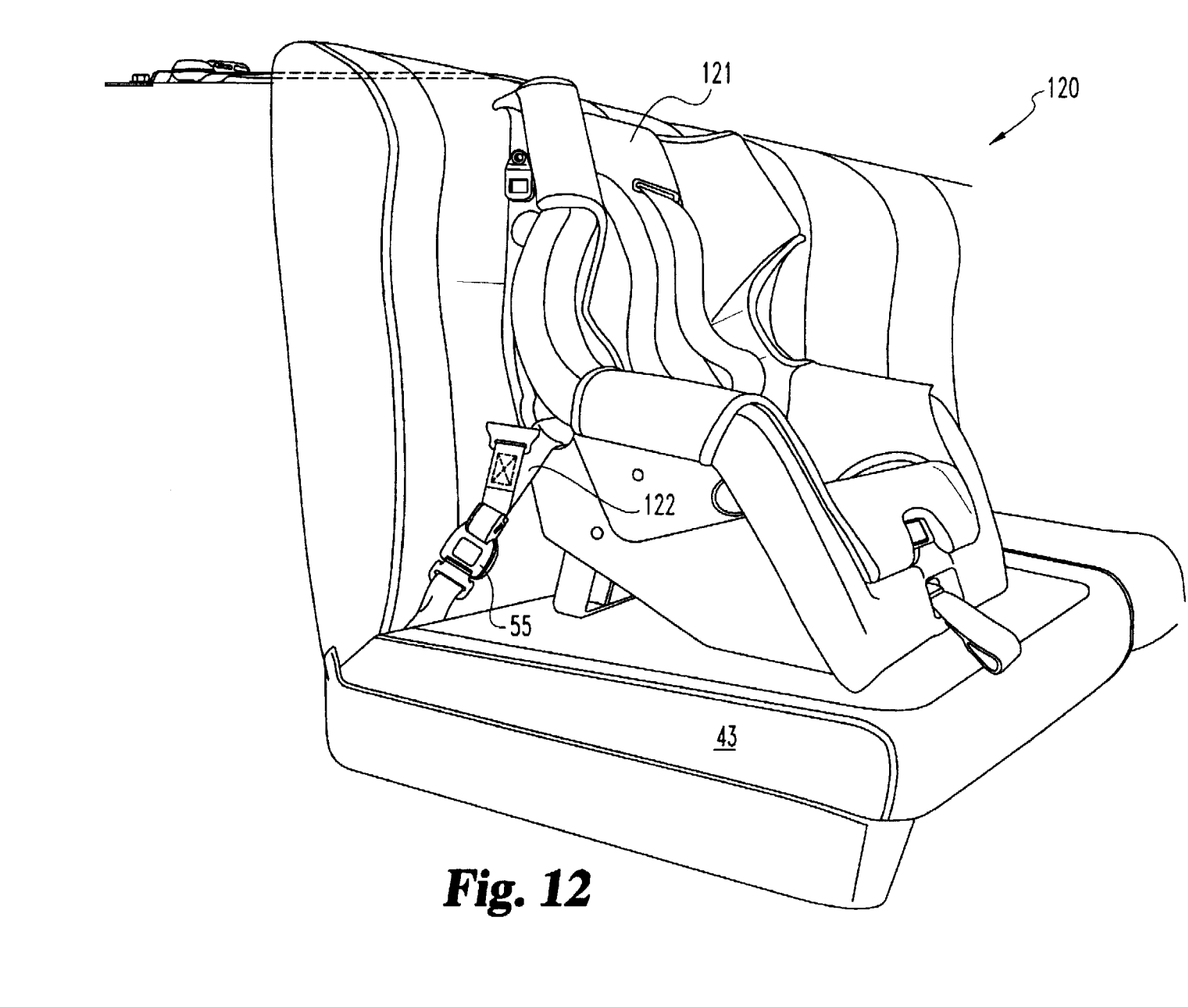
FIG. 12 is the same view as FIG. 11 only showing the child seat facing forward.

A first alternate embodiment of the child seat and passenger seat combination 120 is depicted in FIGS. 11 and 12. A single web 122 extends freely through hand holes 124 and 126 respectively of rear side walls 123 and 125 of child seat 121. The strap is neither attached fixedly to the child seat nor does the combination include the anti-twist mechanism previously described for the child seat of FIG. 8. A conventional seat belt buckle 127 without adjusting means is attached to one end of web 122 whereas the opposite end of the web includes buckle 55 with adjustment means as previously described. Buckles 80 and 127 attach to the tongues 56 extending outwardly from a passenger seat as previously described. Child seat 121 includes storage tongues 111 mounted to the top side walls to receive buckles 80 and 127 in the stored position. The child seat further optionally includes a top web 47 fixedly attach to the top end of the child seat and having a buckle mounted to the distal end thereof to lockingly engage a seat belt tongue mounted atop the rear window sill. Seat 121 may face either rearward as shown in FIG. 11 or forward as shown in FIG. 12.

The middle portion 128 of web 122 (FIG. 11) is positioned between side walls 123 and 125 with the web being mounted by means of the side walls to the child seat. When either the child seat faces rearward (FIG. 11) or forward (FIG. 12), web 122 extends in a straight line from the ends of middle portion 128 at side walls 123 and 125 to the tongues 56 and 127.

Figure 13:
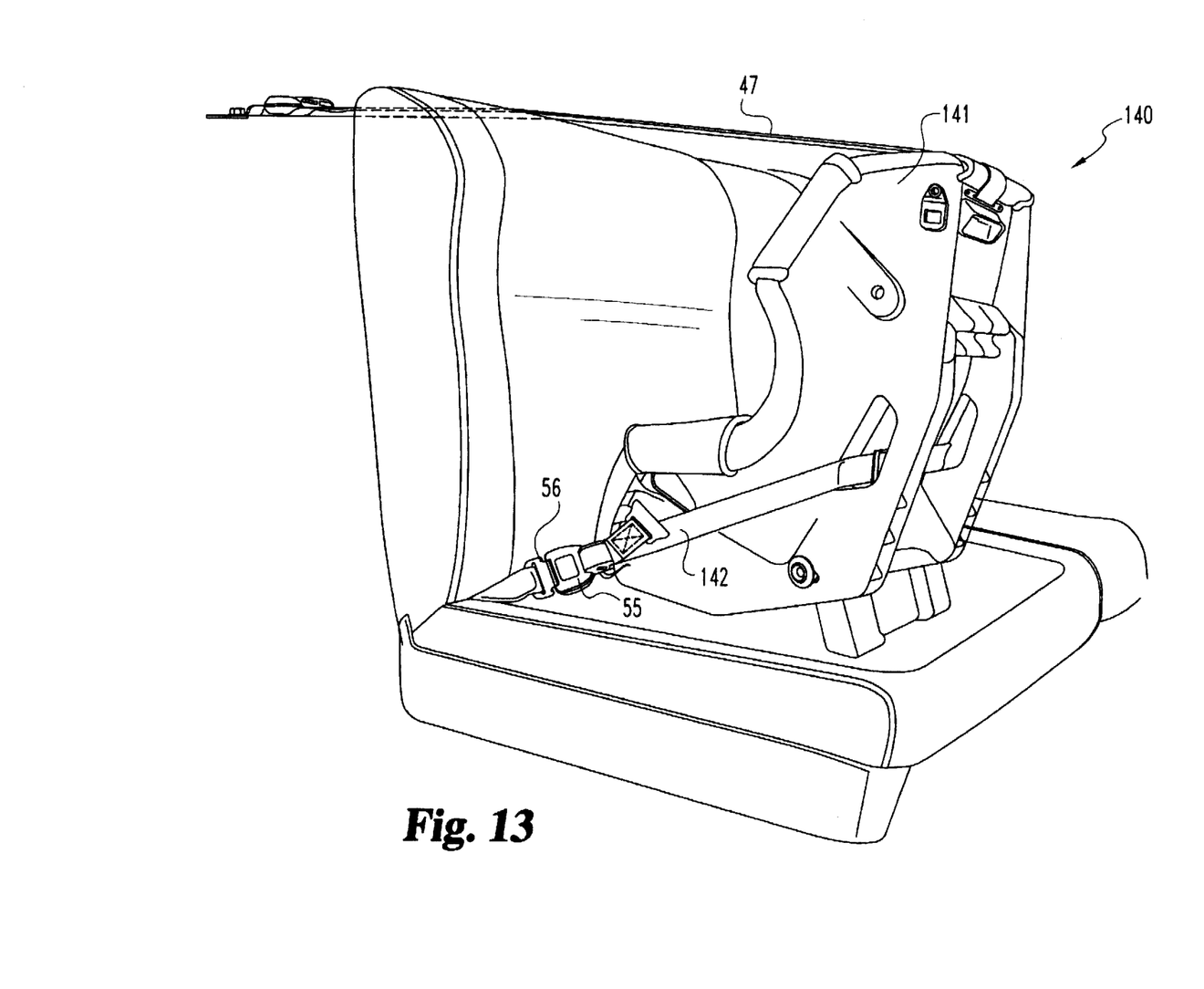
FIG. 13 is a perspective view of a child seat atop a passenger seat incorporating a second alternative embodiment of the present invention.
Figure 14:
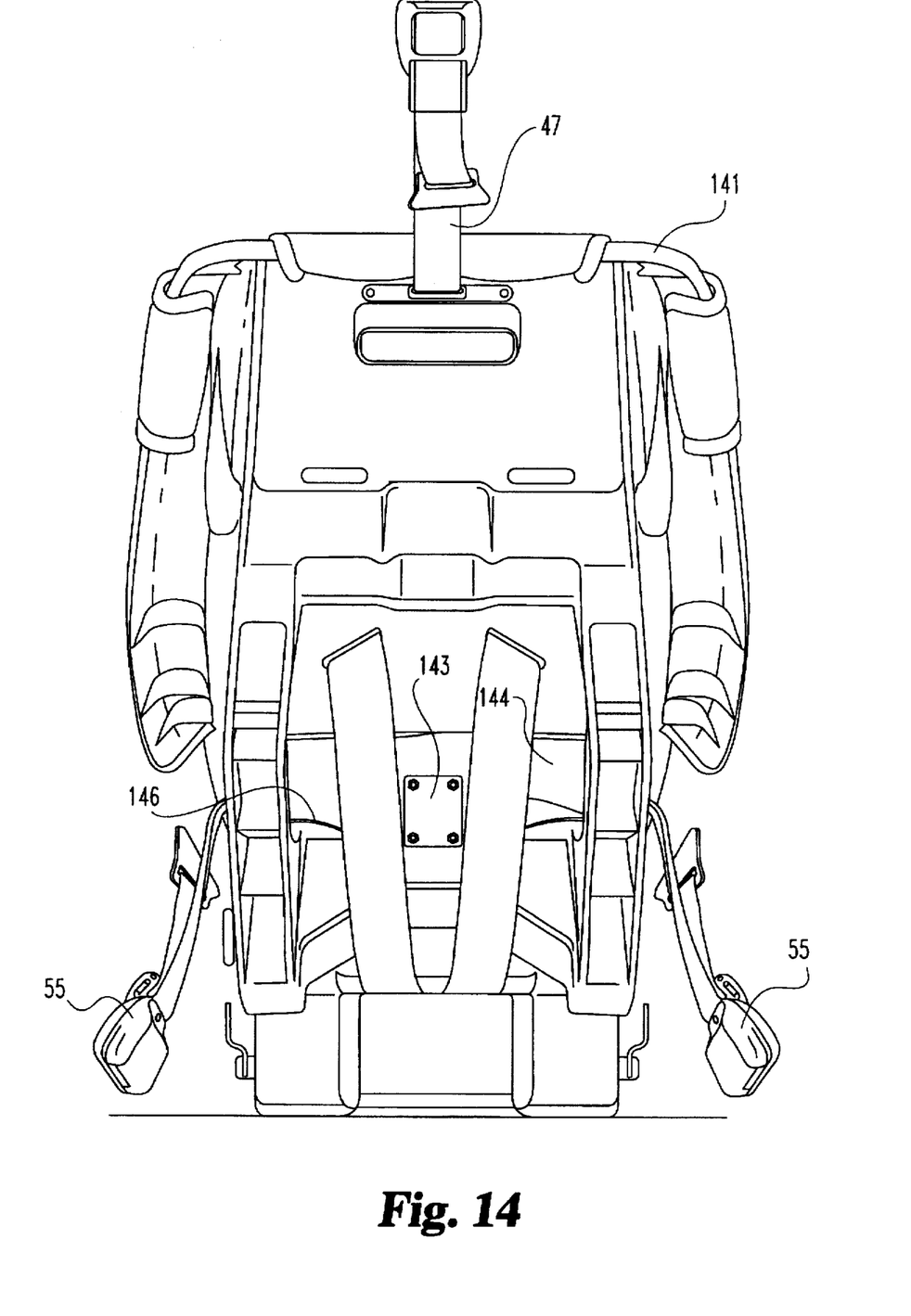
FIG. 14 is a rear view of the child seat of FIG. 13.

Yet a further embodiment is shown in FIGS. 13 and 14. The combination 140 includes a child seat 141 identical child seat 121 with the exception that the single strap 142 is fixedly mounted to the rear wall of the child seat and with the further exception that a pair of buckles 80 having adjustment means thereon are provided at the opposite ends of the web. Thus, web 142 extends through hand holes of the rear side walls with the middle portion 146 of web 142 being positioned between and fastened to the rear wall 144 of the child seat by a plate 143 positioned outwardly of and against the web middle portion 146. Conventional fastening devices secure plate 143 to wall 144. Child seat 141 may face rearward or forward and in either case, web 142 extends in a straight line from the rear side walls to buckles 55. The child seat includes storage tongues located at the top end of the rear walls to receive buckles 80 when not in use. Likewise, an optional top web 47 as described for the prior embodiments may be utilized.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A child seat mounting arrangement in combination with a vehicle passenger seat for a vehicle comprising:

a child seat positionable atop said passenger seat in a first position whereat the child faces forwardly on said passenger seat and in a second position whereat the child faces rearwardly on said passenger seat, said child seat including a seat portion and a back portion upon and against which the child rests;

flexible web means on said child seat and having distal end portions;

first locking devices mounted to said distal end portions;

adjustment means engaged with said web means operable to control tightness of said web means;

second locking devices adapted to be mounted to said vehicle adjacent said passenger seat and lockingly engageable with said first locking devices to secure said child seat to said passenger seat when said child seat is in said first position and when in said second position; and, an anti-twist pivot mechanism mounted to said back portion of said child seat, said mechanism having a passage into which said web means extends, said mechanism pivotally mounting said web means to said child seat pivoting said web means when said first locking devices are lockingly engaged with said second locking devices to automatically allow said web means to extend in a straight line toward said second locking devices regardless of the positioning of said child seat upon said passenger seat in said first position and said second position; and wherein:

said web means includes a web;

said pivot mechanism includes a pair of slots located on opposite sides of said child seat, said web extends through said slots and is fixedly attached to said mechanism;

said first locking devices each include a release push button facing outwards relative to said child seat by said pivot mechanism without web twisting when in said first position and said second position.

2. The child seat mounting arrangement of claim 1 wherein:

said mechanism includes a tube rotatably mounted to said back portion of said child seat, said web extends through and out of said tube.

3. A child seat mounting arrangement in combination with a vehicle passenger seat for a vehicle comprising:

a child seat positionable atop said passenger seat in a first position whereat the child faces forwardly on said passenger seat and in a second position whereat the child faces rearwardly on said passenger seat, said child seat including a seat portion and a back portion upon and against which the child rests;

flexible web means on said child seat and having distal end portions;

first locking devices mounted to said distal end portions;

adjustment means engaged with said web means operable to control tightness of said web means;

second locking devices mounted to said vehicle adjacent said passenger seat and lockingly engageable with said first locking devices to secure said child seat to said passenger seat when said child seat is in said first position and when in said second position;

a top flexible web having a top proximal end mounted to an upper portion of said child seat and further having an outer end;

a third locking device mounted to said outer end of said top flexible web; and, a fourth locking device adapted to be mounted to said vehicle above said passenger seat and lockingly engageable with said third locking device to secure said child seat to said passenger seat when said child seat is in said first position and when in said second position.

4. A child seat for mounting atop a vehicle passenger seat comprising:

a child seat adapted to be positionable atop said passenger seat in a first position whereat the child faces forwardly on said passenger seat and in a second position whereat the child faces rearwardly on said passenger seat;

a flexible web mounted to opposite sides of said child seat with said webs having distal end portions;

first locking devices mounted to said distal end portions of said webs;

second locking devices mountable adjacent said passenger seat and lockingly engageable with said first locking devices is adapted to secure said child seat to said passenger seat when said child seat is in said first position and when in said second position; and, an anti-twist pivot mechanism mounted to said child seat, said mechanism having a passage into which said web extends, said mechanism pivotally mounting said web to said child seat pivoting said web when said first locking devices are lockingly engaged with said second locking devices to automatically allow said webs to extend in a straight line toward said second locking devices regardless of the positioning of said child seat upon said passenger seat in said first position and said second position; and wherein:

said first locking devices each include a release push button facing outwards relative to said child seat by said pivot mechanism without web twisting when in said first position and said second position.

5. The child seat of claim 4 wherein:

said child seat has opposite sides with said mechanism movably mounted to said opposite sides with said flexible web extending therefrom in a straight line toward said second locking devices regardless of the positioning of said child seat upon said passenger seat when said first locking devices are lockingly engaged with said second locking devices; and further comprising:

adjustment means on said web operable to control tightness of said web.

6. The child seat of claim 5 wherein:

said adjustment means is fixedly mounted respectively to at least one of said first locking devices.

7. The combination of:

a vehicle passenger seat having a generally vertical extending cushion and a bottom cushion upon which a passenger may be seated;

a child seat positionable atop and against said bottom cushion in a forwardly facing position and in a rearwardly facing position, said child seat including opposite sides with aligned holes defining a passage;

a flexible web extending through said passage and having outer end portions;

a pair of first locking devices fastened to said outer end portions;

a pair of second locking devices mounted to said passenger seat with said second locking devices releasable and lockingly engageable with said first locking devices to limit relative motion between said child seat and said passenger seat;

adjustment means engaged with said web operable to control tightness of said web and further operable to allow selection of the length of said web between said first locking devices to enable said web to lengthen to position said first locking devices to lock to said second locking devices when in said forwardly facing position and said rearwardly facing position: and, a web holder mounted to said child seat with said web extending therein, said holder being rotatably mounted positioning said web along a pair of straight lines extending from said holder to said second locking devices when said child seat is in said forwardly facing position and when in said rearwardly facing position.

* * * * *